Oct. 2, 1962     V. D. ROOSA     3,056,503

FILTER ASSEMBLY

Filed Feb. 20, 1958

INVENTOR.
VERNON D. ROOSA

BY

*Lindsey and Prutzman*

ATTORNEYS

United States Patent Office 3,056,503
Patented Oct. 2, 1962

3,056,503
FILTER ASSEMBLY
Vernon D. Roosa, West Hartford, Conn. (% Hartford Machine Screw Co., P.O. Box 1440, Hartford, Conn.)
Filed Feb. 20, 1958, Ser. No. 716,358
2 Claims. (Cl. 210—234)

This invention relates to improvements in filter assemblies and particularly to liquid fuel filter assemblies of a type for use in the fuel feed system of diesel engines and other types of internal combustion engines, particularly of the fuel injection type.

A primary object is to provide an improved filter assembly of the type in which a filter cartridge serves as part of the assembly housing; the cartridge of which can be replaced by persons of limited mechanical skill without use of special tools; and without danger of breakage during reassembly.

Other objects are to improve the seal between a replaceable filter element and its supporting assembly; and to provide improved protective means to prevent either water or air from entering the fuel line during cartridge replacement.

Other objects will be in part obvious, and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
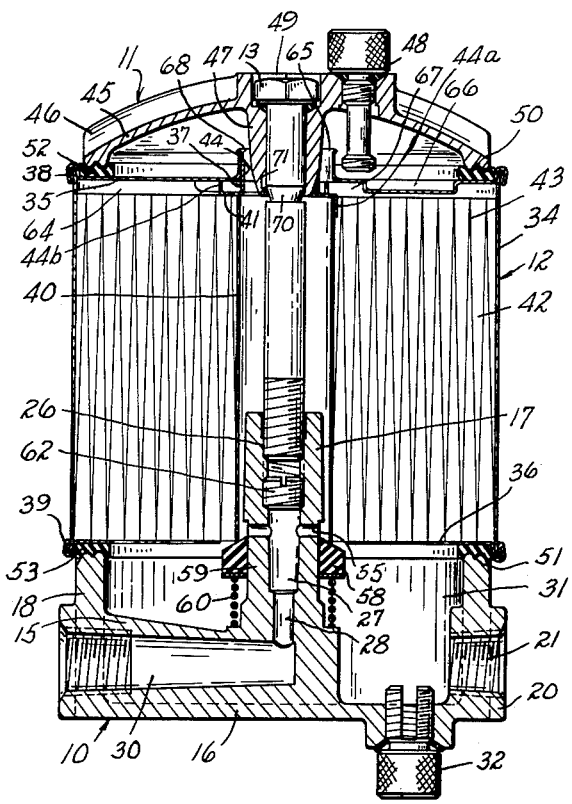
FIG. 1 illustrates, in diametric vertical section, a filter assembly incorporating the present invention.
Figure 2:
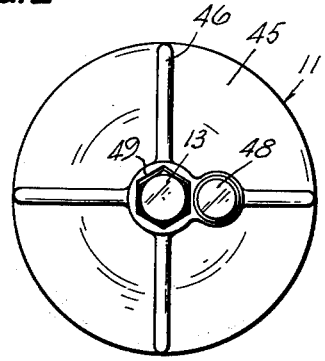
FIG. 2 is a plan view of the head cap shown in FIG. 1.
Figure 3:
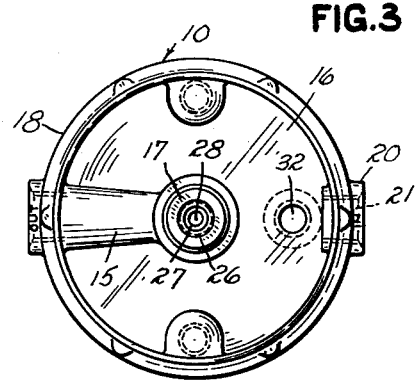
FIG. 3 is a plan view of the base portion of the device of FIG. 1 with the head cap and cartridge removed.

As shown in FIG. 1, major components of the assembly are a base 10, an enclosure cap 11, a form sustaining replaceable cartridge 12 and a bolt 13 maintaining cartridge 12 in fluid sealed clamped engagement between base 10 and cap 11.

The base 10 may be an integral metallic casting or the like with a closed lower end wall 16 provided with a radial rib 15 leading into a central hub portion 17 and having a cylindrical side wall 18. Wall 18 has formed thereon a boss 20 which is apertured and internally threaded to define an inlet port 21 for threaded coupling to a fluid inlet conduit (not shown). Hub portion 17 is provided with a multiple diameter central passage including a threaded bore 26 leading to a tapered chamber 27 and a bore 28 of reduced diameter which communicates with an outlet passageway 30 in the radial rib 15 threaded at its outer end for coupling to a fluid outlet conduit (not shown).

The bottom end wall 16 and 18 form a chamber 31 serving as an oil sump from which oil under pressure is forced upwardly under pressure to pass through an oil filtering material within cartridge 12, later described. Foreign matter which may collect in the bottom of the sump may be removed from the fluid system through a threaded bore in bottom wall 16 by removal of drain plug 32 in threaded engagement therewith. Filter cartridge 12 may be of any known type in which oil passage therethrough removes entrained impurities, and may, for example, comprise a cylindrical metal housing 34 having disc-like centrally apertured end walls 35, 36, marginally crimped thereto at 38, 39. Upper wall 35 is centrally apertured to provide centering of an axially positioned tubular conduit 40 to define an annular chamber 42 intermediate conduit 40 and cylinder 34 which houses a suitable filter material, for example, one of the known filter papers 43 in folded configuration as shown. Conduit 40 which may be of a non-metallic material such as fiber or plastic material is positioned marginally of a central aperture in wall 35 by a metallic spider 37 comprising a ring-like base 41 with three upstanding lugs 44 extending from the inner wall thereof into an upturned hub portion 68 of wall 35 and three depending lugs 44a, offset from the upturned lugs, and in clamped engagement with the cylindrical outer wall surface of conduit 40. One or more spacer lugs 44b extend upwardly from the outer margin of base 41 to restrict axial movement of conduit 40 toward end wall 35. Conduit 40 is actually supported by filtering material 43, to which it is attached, the upturned lugs 44 of spider 37 loosely engaging the inner wall of hub 68 to insure proper centering of conduit 40. Lower end wall 36 is multiply apertured to allow fluid passage from chamber 31 to chamber 42, but it does not necessarily connect with the lower end of conduit 40, since in any event it is floatably positioned at that end by the filter material 43 and is held centered upon assembly of the device by valve member 58, as later described.

Closure cap 11 comprises a dome-like wall 45 integral with strengthening ribs 46 which also provide a grip for manual rotation of cap 11, and a hub portion 47 depending therefrom and center-bored to receive bolt 13, with the head thereof recessed in channel 49 of a cross sectional configuration to complement the bolt head to prevent rotation of the bolt in respect to cap 11, as shown in FIG. 1. The shank of bolt 13 is conically channeled at 70 to permit the depending end of hub 47 to be marginally peened, with bolt 13 in the position shown, to prevent its removal. The lower end of bolt 13 is engaged in the threaded bore 26 of the hub 17. Thus cartridge 12 may be clamped between base 10 and cap 11 only by rotation of cap 11 by the bolt 13 forming means extending axially through the tubular member 40 between the base 10 and cap 11 which is releasable or engageable, and that is done manually during assembly or disassembly of the device. An air bleeder valve 48 extends through wall 45, laterally of hub 47 for conventional use in bleeding the assembly of air at any time, such as following cartridge replacement.

The anular lower margin of cap wall 45 is of double rib contour to define a single annular groove 50 therebetween in concentric alignment with a like annular groove 51 formed in the same manner in the upwardly directed annular end of wall 18 of base member 10, for complemental sealing engagement with a pair of annular rubber-like members 52 and 53 marginally bonded by a known rubber-to-metal technique to the opposite end walls 35, 36 of filter cartridge 12 adjacent the crimped margins 38, 39 of cylinder 34. Hub 17 is provided with one or more radial passages 55 leading into bore 27 to provide fluid passage between the interior of cylinder 40 and outlet passage 30, through bore 28. Passages 55 are positioned above chamber 31 to prevent water, which may have entered the chamber during cartridge replacement, from entering the fluid outlet system.

An annular valve 58 is slidably mounted to a reduced diameter portion 59 of hub 17 and biased by coil spring 60 against the lower end of tube 40 below radial passages 55. As above mentioned, the lower end of tube 40 may be floatably positioned by the filter cartridge. Valve 58 is provided with a conical upper wall forming a seat for engagement with the lower end of tube 40 for positive centering of tube 40 under bias of spring 60 while tube 40 serves as a stop member to prevent the closure of passages 55 by valve 58. Upon disassembly of the unit for cartridge replacement, valve 58 moves under the urge of spring 60 to close passages 55 to prevent air from entering the outlet passages, bore 26 being sealed at the entrance of bore 27 by threaded plug 62.

Operation of the device is as follows. Liquid fuel under pressure enters port 21 to fill chamber 31 and pass through apertured lower wall 36 of cartridge 12 and throguh the filtering material 43 therein from the lower to the upper end of cartridge 12 as shown in FIG. 1 As the filtered fluid completes its passage through the filtered material it fills an annular chamber 64 between the mass of filter material 43 and upper end wall 35 of cartridge 12. Fluid from chamber 64 flows over the base 41 of spider 37 through channels 67 formed between cartridge end wall 35 and spider 37, spacer lugs 44b defining the depth of channel 67 which is of annular configuration and interrupted only by upturned lugs 44 and spacer lugs 44b, between which are open passages 67, FIG. 1 through which fluid flows into cylinder 40 to fill that cylinder and flow inwardly through radial bores 55 to outlet pasage 30. Since both the outer cylinder 34 and the inner cylinder 40 are imperforate, the oil must go through the entire body of the filter cartridge to receive a thorough cleaning prior to reaching the outlet passage 30.

Since the volume of fluid entering cylinder 40 greatly exceeds the amount which can pass through the relatively small diameter bores 55, the fluid overflows through passage 65 defined between hub 68 and hub 47 to fill the chamber defined by cap wall 45 and cartridge wall 35. Air entrapped in the fluid system, such as by cartridge change or through a leak will migrate to that chamber and may be bled off by bleeder valve 48.

The device as illustrated and described thus fulfills the above stated objectives. Assembly of the device after cartridge replacement may be effected manually by an unskilled person since the required amount of clamping pressure may be applied by hand rotation of cap 11 by means of ribs 46, but it would be quite difficult in this manner to apply too much pressure, which is frequently done by use of a wrench which often causes closure cap breakage. Upon removal of a filter cartridge for replacement, the fluid outlet system is automatically sealed by valve 58 to prevent air from entering, and the position of passages 55 above wall 18 of the base member insures that water or dirt does not enter the fluid outlet system during change of the filter cartridge.

The sealing means disclosed has been found particularly effective not only during use, but particularly during cartridge changes, since the double groove and single channel configuration in annular base and closure cap walls permits rotation in either direction, and regardless of the degree of applied pressure, without tending to radially displace the resilient sealing members. The novel structural improvements thus cooperate to produce a substantially improved filter assembly.

I claim:
1. A filter assembly comprising a base having a peripheral upstanding wall to form a sump chamber, an inlet port in said wall communicating with said sump chamber, an outlet in said wall, a hub extending upwardly from said base having an outlet passageway communicating with the outlet in said wall and having a cartridge-seating portion, said hub further having a threaded bore thereon, a clamping cap having a chamber therein, a unitary replaceable filter cartridge mounted between said base and said clamping cap, said cartridge having an imperforate outer wall, an imperforate tubular inner wall to form a fuel return passageway, end walls connecting said inner and outer walls, filter material encased between said end walls and said inner and outer walls, a central opening in each of said end walls communicating with the tubular inner wall, the end wall mounted adjacent said base having a perforation therein to permit fuel to pass through the filter material, the edge of said tubular inner wall of the cartridge adjacent said perforated end wall being seated in sealing relationship on the seating portion of the hub and the edge of the outer wall of the cartridge adjacent said perforated end wall being seated in sealing relationship on the upstanding wall of the base, and a bolt extending from said cap through the inner wall of the cartridge in spaced relation thereto into threaded engagement with the bore in said hub whereby the cartridge is clamped between the base and the cap and whereby the outer wall of the cartridge forms the outer wall of the assembly.

2. A filter assembly as set forth in claim 1 wherein said cartridge seating portion on said hub comprises a sealing gasket on which the end of the inner wall of the cartridge is seated and wherein the upstanding hub portion has a transverse bore communicating with the outlet passageway therein and said sealing gasket is spring biased to a position closing said transverse bore, said sealing gasket being movable by the pressure of the cartridge to a position uncovering said transverse bore when the cartridge is clamped between the base and the cap.

References Cited in the file of this patent
UNITED STATES PATENTS

| | | |
|---|---|---|
| 795,066 | Rogers | July 18, 1905 |
| 1,367,325 | Probst | Feb. 1, 1921 |
| 2,544,244 | Vokes | Mar. 6, 1951 |
| 2,661,846 | Lash | Dec. 8, 1953 |
| 2,732,031 | Rabbitt | Jan. 24, 1956 |
| 2,738,879 | Frantz | Mar. 20, 1956 |

FOREIGN PATENTS

| | | |
|---|---|---|
| 784,484 | France | Apr. 29, 1935 |
| 1,126,833 | France | July 30, 1956 |
| 1,135,207 | France | Dec. 10, 1956 |